A. HALL.
MOUSETRAP.
APPLICATION FILED JUNE 17, 1922.

1,435,841.

Patented Nov. 14, 1922.

Allen Hall
INVENTOR

BY Victor J. Evans
ATTORNEY

Patented Nov. 14, 1922.

1,435,841

UNITED STATES PATENT OFFICE.

ALLEN HALL, OF PITTSBURGH, PENNSYLVANIA.

MOUSETRAP.

Application filed June 17, 1922. Serial No. 568,942.

*To all whom it may concern:*

Be it known that I, ALLEN HALL, a citizen of the United States, residing at Pittsburgh, in the county of Allegheny and State of Pennsylvania, have invented new and useful Improvements in Mousetraps, of which the following is a specification.

This invention relates to traps, and more particularly to a trap specially adapted for catching mice and similar rodents.

One of the main objects of the invention is to provide a trap of simple construction and operation by means of which a number of animals may be caught at one setting of the trap. A further object is to provide a trap in which the various means for catching the animals are effectively separated from each other in such manner as to prevent an animal caught by one of the catching means from springing the adjacent catching means. Further objects will appear from the detailed description.

In the drawings:—

Figure 1:
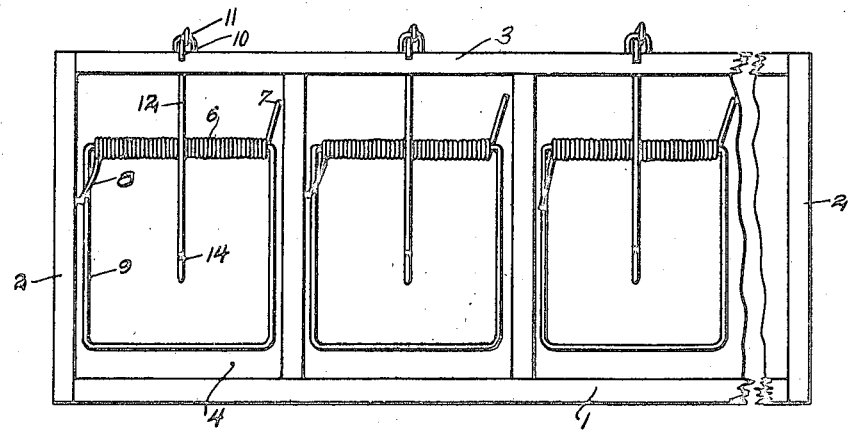
Figure 1 is a side view of the trap.
Figure 2:
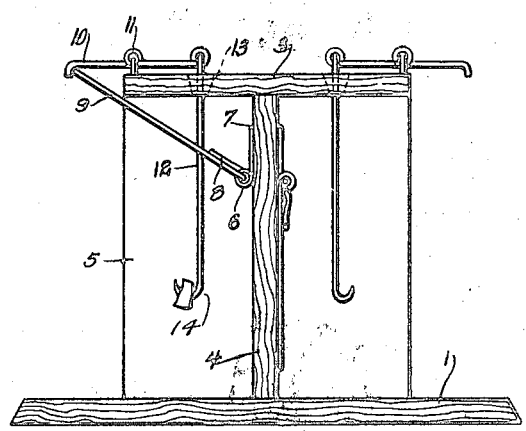
Figure 2 is a transverse vertical section through the trap.

The trap comprises a baseboard 1 to which are secured end boards 2 the upper ends of which are secured to a top board 3. The boards 1, 2 and 3 form a rectangular frame within which is secured a central partition board 4 which extends throughout the whole interior of the frame. Each face of partition board 4 is divided into a plurality of sections by means of vertical partition strips 5 which extend from board 4 to the opposite edges of top board 3. In each section of board 4 there is a coil spring 6 which is secured at one end 7 to board 4. The other end of this spring is extended to form an arm 8 which presses upon a rectangular wire frame 9 loosely mounted through coil 6. This frame, when the trap is set, is held in raised position by a trigger 10 loosely mounted intermediate its ends at 11. At its inner end this trigger is loosely connected to the upper end of a bait rod 12 which passes loosely through an opening 13 through board 3. Rod 12 is provided at its lower end with a hook 14 for reception of any suitable bait.

In practice the trap is set by releasably securing the frames 9 in raised position by means of triggers 10, any suitable or preferred bait being placed upon the hooks 14 of rods 12. Very slight downward movement of rod 12 is sufficient to disengage trigger 10 from frame 9 which, upon being released, is snapped downwardly and inwardly through an arc of approximately 90° toward partition board 4. As frame 9 is moved downwardly and inwardly it is impossible for the mouse or other animal to escape and it is caught between the frame and board 4 and killed. It is to be noted that the partition strips 5 effectually separate the various sections of the lateral faces of board 4 so that a mouse caught between one of the frames 9 and board 4 cannot possibly strike the rod 12 of the adjacent section of the board. This provides very simple and efficient means whereby, in effect, a plurality of traps may be incorporated into one structure at small cost and can be so associated as to prevent any of the traps being sprung by an animal caught in another trap, the traps being so arranged relative to the partition board as to eliminate possibility of the escape of an animal which has sprung the trap.

What I claim is:—

In a trap of the character described, a baseboard, a vertically disposed partition board secured on the base board, a top board secured on the upper edge of the partition board, vertically disposed strips dividing the opposite faces of the partition board into sections, frames mounted on the respective sections of the partition board, means for hingedly securing the upper ends of the frames to said partition board and for forcing the frames toward the partition board, triggers loosely mounted on the top board and positioned to engage the respective frames for holding the same raised, and bait rods positioned adjacent to the frames and connected to the triggers to move the same in frame-releasing direction upon movement of the bait rods in a predetermined direction.

In testimony whereof I affix my signature.

ALLEN HALL.